(12) United States Patent
Groeneveld (10) Patent No.: US 9,102,859 B2
(45) Date of Patent: Aug. 11, 2015

(54) METHODS FOR DUST CONTROL ON SALINE DRY LAKEBEDS USING MINIMAL WATER RESOURCES

(71) Applicant: David P. Groeneveld, Santa Fe, NM (US)

(72) Inventor: David P. Groeneveld, Santa Fe, NM (US)

( * ) Notice: Subject to any disclaimer, the term of this patent is extended or adjusted under 35 U.S.C. 154(b) by 0 days.

(21) Appl. No.: 13/941,533

(22) Filed: Jul. 14, 2013

(65) Prior Publication Data

US 2015/0016891 A1 Jan. 15, 2015

(51) Int. Cl.
*C09K 3/22* (2006.01)
*B09C 1/08* (2006.01)

(52) U.S. Cl.
CPC .... *C09K 3/22* (2013.01); *B09C 1/08* (2013.01)

(58) Field of Classification Search
CPC .................................. C09K 3/02; B09C 1/08
USPC .......... 405/15, 53, 57, 58, 263, 302.4, 302.6; 73/170.32; 252/88.1
See application file for complete search history.

(56) References Cited

U.S. PATENT DOCUMENTS

| | | | | |
|---|---|---|---|---|
| 2,176,266 A * | 10/1939 | Malmberg | ..................... | 405/263 |
| 3,490,241 A * | 1/1970 | Kuhn | ............................. | 405/263 |
| 3,900,611 A * | 8/1975 | Corbett et al. | ................ | 427/214 |
| 4,001,033 A * | 1/1977 | Anthone et al. | ......... | 106/287.23 |
| 4,038,443 A * | 7/1977 | Jacoby | .......................... | 427/136 |
| 4,136,050 A * | 1/1979 | Brehm | ........................ | 252/88.1 |
| 4,369,121 A * | 1/1983 | Callahan et al. | ................ | 299/12 |
| 4,589,804 A * | 5/1986 | Paeglis et al. | ................ | 405/270 |
| 4,592,931 A * | 6/1986 | Cargle | .......................... | 427/136 |
| 4,690,589 A * | 9/1987 | Owa | .............................. | 405/263 |
| 4,815,790 A * | 3/1989 | Rosar et al. | ....................... | 299/4 |
| 4,960,532 A * | 10/1990 | Kremer | ....................... | 252/88.1 |
| 5,857,809 A * | 1/1999 | Kugler | .......................... | 405/263 |
| 6,000,880 A * | 12/1999 | Halus | ............................. | 405/52 |
| 6,395,051 B1 * | 5/2002 | Arnold et al. | ..................... | 71/27 |
| 6,416,252 B1 * | 7/2002 | Moore | ..................... | 405/129.45 |
| 6,419,836 B1 * | 7/2002 | Willuweit | ..................... | 210/749 |
| 6,660,049 B1 * | 12/2003 | Day | ................................. | 23/300 |
| 6,669,752 B2 * | 12/2003 | Arnold et al. | ..................... | 71/27 |
| 6,729,805 B2 * | 5/2004 | Wathen | ......................... | 405/263 |
| 6,851,891 B2 * | 2/2005 | Baumgartner et al. | .... | 405/129.9 |
| 7,070,709 B2 * | 7/2006 | Schilling et al. | ............. | 252/88.1 |
| 7,157,021 B2 * | 1/2007 | Bytnar et al. | ................ | 252/88.1 |
| 7,381,014 B1 * | 6/2008 | Bird et al. | ..................... | 405/263 |
| 2003/0070589 A1 * | 4/2003 | Boston | ......................... | 106/719 |
| 2004/0018133 A1 * | 1/2004 | Radway | .................. | 423/244.05 |
| 2004/0065198 A1 * | 4/2004 | Wolff et al. | ..................... | 95/154 |
| 2004/0091324 A1 * | 5/2004 | Schilling et al. | ............. | 405/263 |
| 2005/0194566 A1 * | 9/2005 | Schilling et al. | ............. | 252/88.1 |
| 2006/0280561 A1 * | 12/2006 | Roesler et al. | ................ | 405/263 |
| 2007/0014639 A1 * | 1/2007 | Crill | .............................. | 405/263 |
| 2007/0085055 A1 * | 4/2007 | Sikes et al. | .................... | 252/88.1 |
| 2007/0135561 A1 * | 6/2007 | Rath et al. | ..................... | 524/557 |
| 2007/0167332 A1 * | 7/2007 | Subramanian et al. | ........ | 507/240 |
| 2008/0200746 A1 * | 8/2008 | Bird et al. | ..................... | 588/318 |
| 2008/0213049 A1 * | 9/2008 | Higgins et al. | ............. | 405/302.6 |
| 2011/0020071 A1 * | 1/2011 | Groeneveld | .................. | 405/263 |
| 2011/0262228 A1 * | 10/2011 | Groeneveld | ..................... | 405/16 |
| 2012/0177449 A1 * | 7/2012 | Groeneveld | .................. | 405/263 |
| 2012/0290140 A1 * | 11/2012 | Groeneveld | .................. | 700/284 |
| 2012/0328376 A1 * | 12/2012 | Groeneveld | .................. | 405/263 |
| 2013/0104455 A1 * | 5/2013 | Groeneveld | ............. | 47/58.1 SC |

* cited by examiner

*Primary Examiner* — Benjamin Fiorello
(74) *Attorney, Agent, or Firm* — Paul Adams (57) ABSTRACT

A brine membrane method for controlling dust on a saline lakebed is disclosed comprising the steps of creating or locating an existing wetting basin, depositing precipitated salts in the basin, and depositing a brine over the salts to form a brine membrane.

13 Claims, 8 Drawing Sheets

METHODS FOR DUST CONTROL ON SALINE DRY LAKEBEDS USING MINIMAL WATER RESOURCES

This patent application is a continuation-in-part of non-provisional patent application Ser. No. 13/157,243 filed on Jun. 9, 2011 which claimed priority to non-provisional application Ser. No. 12/841,971, filed on Jul. 22, 2010, which claimed priority to U.S. Provisional Patent Application Ser. No. 61/228,271 entitled "System and Method for Use of Natural Brine To Prevent Fugitive Dust Using Minimal Water," filed on Jul. 24, 2009; U.S. Provisional Patent Application Ser. No. 61/254,112 entitled "System and Method for Use of Natural Brine to Prevent Fugitive Dust Using Minimal Water," filed on Oct. 22, 2009; U.S. Provisional Patent Application Ser. No. 61/315,461 entitled "Method for Employing Clay for Construction of Low Cost Pond Liners," filed on Mar. 19, 2010; U.S. Provisional Patent Application Ser. No. 61/326,468 entitled "Chloride Salts With Divalent Cations Provide Temporary Surface Stabilization in Saline Systems Dominated by Sodium," filed on Apr. 21, 2010; and U.S. Provisional Patent Application Ser. No. 61/358,249 entitled "Chloride Salts with Divalent Cations and Polyacrylamide Provide Temporary Surface Stabilization in Saline Systems Dominated by Sodium," filed on Jun. 24, 2010.

This continuation-in-part non-provisional patent application also claims the benefit of the priority of U.S. Provisional Patent Application Ser. No. 61/228,271 entitled "System and Method for Use of Natural Brine To Prevent Fugitive Dust Using Minimal Water," filed on Jul. 24, 2009; U.S. Provisional Patent Application Ser. No. 61/254,112 entitled "System and Method for Use of Natural Brine to Prevent Fugitive Dust Using Minimal Water," filed on Oct. 22, 2009; U.S. Provisional Patent Application Ser. No. 61/326,468 entitled "Chloride Salts With Divalent Cations Provide Temporary Surface Stabilization in Saline Systems Dominated by Sodium." Filed on Apr. 21, 2010; and U.S. Provisional Patent Application Ser. No. 61/358,249 entitled "Chloride Salts with Divalent Cations and Polyacrylamide Provide Temporary Surface Stabilization in Saline Systems Dominated by Sodium," filed on Jun. 24, 2010. The entire content of non-provisional patent application Ser. No. 12/841,971, identified above, and the above-identified provisional patent applications for which priority is claimed for this non-provisional continuation-in-part application are incorporated by reference into this non-provisional continuation-in-part application.

BACKGROUND AND SUMMARY

Figure 1:
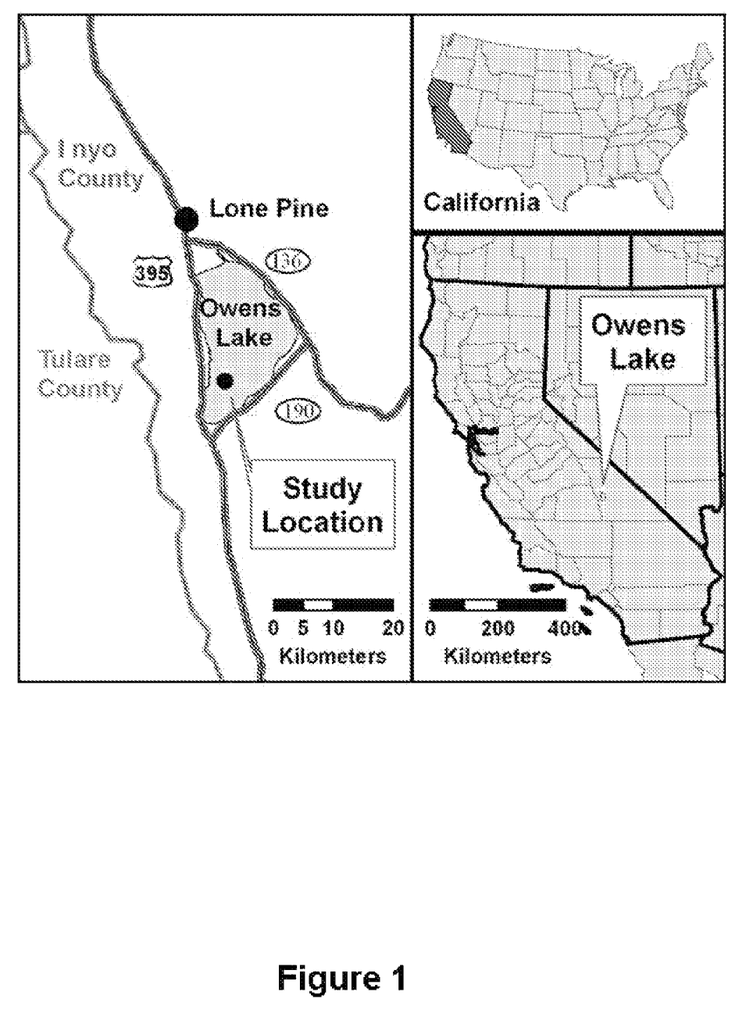
FIG. 1 comprises three maps to illustrate the location of Owens Lake in California in the United States.

The present invention relates generally to the field of ecological management and more particularly to the field of dust control or abatement of saline soils dominated by sodium salts using minimal water resources. One embodiment of the invention was developed for the bed of Owens Lake in Eastern California (FIG. 1) that is dominated by carbonate and sulfate salts of sodium; however, the embodiment described herein is applicable to any environment that presents salt chemistry similar to that within the Owens Lake bed, including for example, other saline dry lakes or sumps receiving and concentrating water from agricultural drainage.

Soils enriched with sodium carbonate and sodium sulfate through agricultural drainage, similar salty beds exposed due to anthropomorphically-changed hydrology (like the Owens Lake), and natural dry lakebeds with shallow groundwater connection are prone to create large sources of airborne dust that can cause health and safety hazards within the surrounding region. Owens Lake was the historic terminus of the Owens River that was diverted for export by the City of Los Angeles resulting in desiccation of the lake early in the last century.

The Owens Lake bed is highly saline with some locations containing up to around 60% by weight of the salts sodium carbonate, sodium bicarbonate and sodium sulfate. When these salts are dissolved by rain or snow during cold temperatures, they re-precipitate as decahydrate that incorporates 10 molecules of water for each salt molecule. The temperatures governing re-precipitation that incorporates decahydrate occurs at about 50 degrees Fahrenheit for sodium carbonate salts and about 65 degrees Fahrenheit for sodium sulfate salts.

Re-precipitation of salts in the decahydrate form causes crystals to swell 4-5 times their volume. Decahydrate salt crystals lose water molecules in alternating warm and cold temperatures in winter and especially during warm sunny days. This process destroys soil cohesion and renders the surface easily lofted by only moderate winds of about 15 miles per hour. This salt-phase-change mechanism is largely responsible for the severe dust problems at Owens Lake, prompting it to be the recognized as the largest single dust source in the United States.

Federal and state laws mandate that the City of Los Angeles Department of Water and Power (LADWP) perform dust control for Owens Lake recognized as the former single largest source of respirable particulate air pollution in the United States. Through several decades of intensive study, three dust control methods have been identified by the agency responsible for monitoring and enforcing dust control: wetting the surface, covering the surface with vegetation, or covering the surface with gravel. Of these three, only surface wetting, in constructed artificial (man-made) wetting basins has been able to accomplish dust control within the time and scale required.

Unfortunately, wetting of the Owens Lake surface is using enormous amounts of water—LADWP uses four feet per year to plan for the required water application for dust control through the dust control season. The total amount of water use can greatly exceed 100,000 acre feet per year on over 40 square miles of the lakebed—this amount is sufficient water to supply about 400,000 families. Within the critically water-short semi-arid southeastern California region, this annual consumption of water for dust control is not sustainable.

Figure 2:
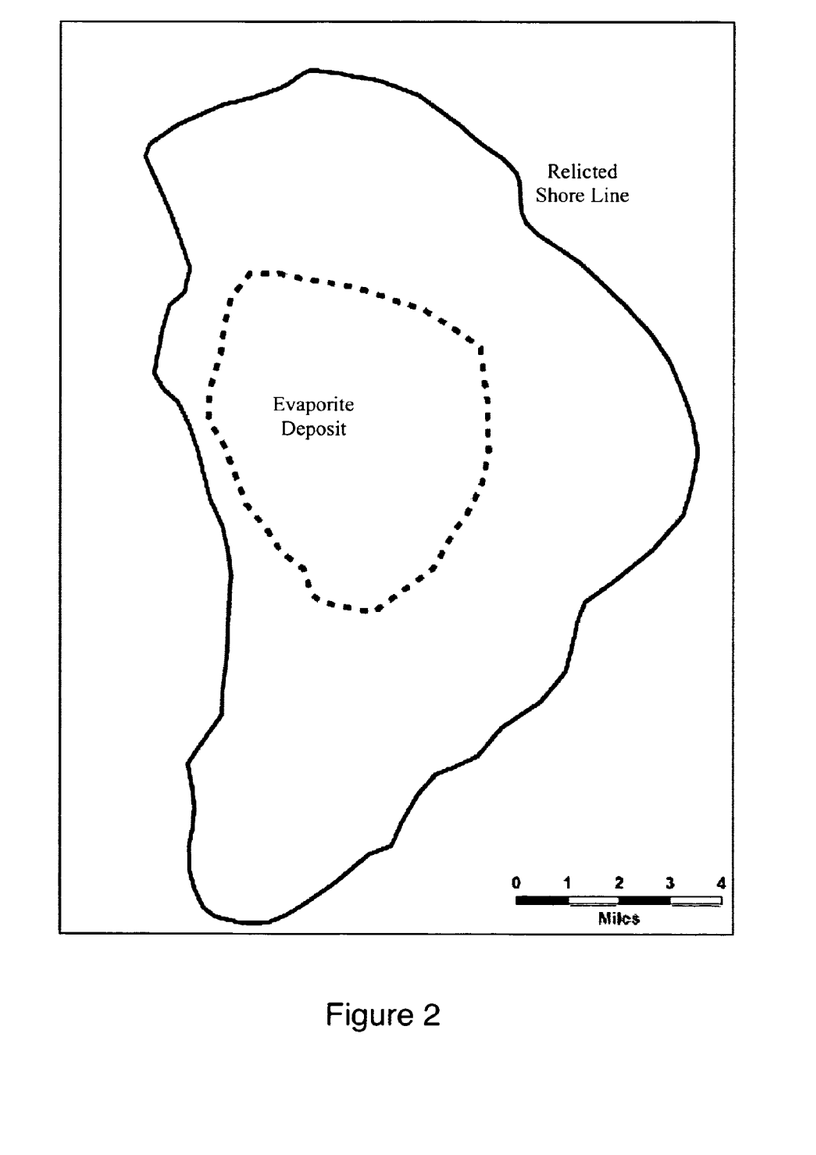
FIG. 2 is a graphic map showing the relicted shore of Owens Lake and an approximate outline of an evaporite deposit as a dashed line.

During the process of desiccation, naturally saline Owens Lake water concentrates to form an evaporite deposit in the lakebed's lowest topography. The evaporite deposit covers about 34 square miles, has an average depth of about 2.6 feet and varies in thickness from a few inches to about 9 feet (FIG. 2). The evaporite deposit consists of precipitated salts and salt held in concentrated aqueous solution. This aqueous solution is brine, dominated by sodium chloride that remains in solution because it is much more soluble than sodium sulfate and sodium carbonate at common ambient temperatures at the Owens Lake. The sodium chloride-rich brine isolates the potentially emissive salts of sodium carbonate and sodium sulfate from atmospheric desiccation, thereby protecting the source deposit from being dust emissive. The term "wetting basin" is synonymous with "dust control wetting basin" and is a polygonal area enclosed by berms flooded with water to control dust emissions from the lakebed as seen in FIG. 2.

The present invention includes systems and/or methods that will protect the surface from releasing dust, use present infrastructure, if available, that was built to provide surface wetting (or at other sites, create such infrastructure) with minor modification, consume minimal water resources for startup, and consume little or no additional water for maintenance. Each of three methods provides the surface protection by working with the natural properties of the salts present within the Owens Lake system. In one of the methods a different type of salt is imported that, with another ingredient, works to stabilize the surface.

The embodiments of the present invention comprise three methods:
(1) The use of brine from salt mined, dissolved and moved from a natural source deposit to create salt deposits within reconfigured wetting basins, including basins that were originally created for dust control using fresh water flooding. These created salt deposits will form a "Brine Membrane" that mimics the stable non-dust-emissive source deposit by having horizontal beds of precipitated salts with the most soluble salts retained within a sodium chloride brine solution that bathes and caps the precipitated horizontal beds of salt beneath. The control of evaporation by the Brine Membrane maintains the deposit in a wetted state (non-desiccated, non-dust emissive).
(2) The use of small quantities of polymer and divalent cation salts of chloride (for example calcium chloride) to stabilize emissive areas of exposed lakebed, not yet treated by construction and flooding of wetting basins. This is called the "Interim Solution" since it allows for later conversion to a wetting basin or to conversion by the Brine Membrane method once the wetting basin is constructed. The Interim Solution can provide stability on very large areas and can provide protection for wetting basins that were formerly filled with fresh water for dust control.
(3) The use of measurements of soil temperatures to predict when the soil temperature within flooded wetting basins reaches and exceeds the governing temperature when the salts of sodium sulfate and carbonate will no longer undergo phase changes that would render a desiccating surface prone to windborne dust emission. This method is called "Springtime Conservation" because it curtails water to control the dust in wetting basins as the temperatures warm during the spring.

All three of these methods provide a transformation from the current wasteful practice of flooding emissive surfaces with large amounts of water that evaporates annually, while protecting the lakebed surface from windborne dust emission.

A brief description of the three methods follows.

Brine Membrane

The Brine Membrane method of the embodiment may be summarized as requiring mining, dissolution and movement of large quantities of salts from a source deposit to prepared wetting basins where it will form similar salt deposits that will replace fresh water, transforming the wetting basins from a wasteful byproduct of evaporation to a non-water consuming, non-dust emissive surface. Sodium chloride, the salt that provides the protective mechanism responsible for retaining the non-emissive qualities of a lakebed source deposit, may be present in limited but sufficient quantities, if managed correctly. Thus, managing the sodium chloride resource between the salt beds created within the wetting basins and the source deposit ensures that this mineral is not depleted in either environment so that both are protected from desiccation and the salt masses remain non-dust-emissive. Because the salt bed that is created tends to remain wetted perpetually, the Brine Membrane method qualifies as shallow flooding that is recognized as a Best Available Control Measure, approved for application to control dust from the Owens Lake bed.

The Brine Membrane concept arose out of scientific discoveries at Owens Lake during study of evaporation from the evaporite deposit as reported by the inventor and others in an article entitled "Floating brine crusts, reduction of evaporation and possible replacement of fresh water to control dust from Owens Lake bed, California," Groeneveld, D. P., Huntington, J. L. and Barz, D. D., *Journal of Hydrology*, 392 (2010) 211-218, published Oct. 15, 2010. The following two paragraphs are the summary and conclusion from that paper.

"Owens Lake, Calif., a saline terminal lake desiccated after diversion of its water source, was formerly the single largest anthropogenic source of fugitive dust in North America. Over 100 billion $m^{-3} \cdot yr^{-1}$ of fresh water are projected to be used for mandated dust control in over 100 $km^2$ of constructed basins required to be wetted to curtail emissions. An extensive evaporite deposit is located at the lake's topographic low and adjacent to the dust control basins. Because this deposit is non dust emissive, it was investigated as a potential replacement for the fresh water used in dust control. The deposit consists of precipitated layers of sodium carbonate and sulfate bathed by, and covered with brine dominated by sodium chloride perennially covered with floating salt crust. Evaporation (E) rates through this crust were measured using a static chamber during the period of highest evaporative demand, late June and early July, 2009. Annualized total E from these measurements was significantly below average annual precipitation, thus ensuring that such salt deposits naturally remain wet throughout the year, despite the arid climate. Because it remains wetted, the evaporite deposit has the potential to replace fresh water to achieve dust control at near zero water use.

Floating salt crusts that cover NaCl-dominated brine are the expected surface condition for the natural evaporite deposit at Owens Lake. These floating crusts reduce evaporation to levels less than precipitation, thus ensuring that the evaporite body remains wetted at all times. Moving salts from an existing evaporite deposit to the dust control basins may, therefore, offer a viable replacement for the fresh water used for dust control on the dry lakebed. Using the adjacent non-dust-emissive natural evaporite deposit as a model, salt deposits created in the dust control basins could be engineered to contain substantially equal proportions of precipitated salts of $Na_2SO_4$ and $Na_2CO_3$, below, capped by a layer of NaCl-dominated brine. Salt crusts would form atop this supernatant brine layer to reduce annual E to less than annual precipitation, thus ensuring that the engineered salt deposits would also remain wet and non-emissive. Once established, the natural properties of salt deposits modeled upon the natural deposit may enable complete dust control with near zero additional fresh water."

These scientific findings prompted additional research that concluded that creation of the Brine Membrane over large areas of the Owens Lake bed would introduce profound water conservation for dust control. This research also found that large-scale application of the Brine Membrane is practical because there are sufficient salts within the evaporite deposit to treat a large proportion of the existing dust control wetting basins without creating additional fugitive dust sources, and that the technology required can be adopted for Brine Membrane implementation. The Brine Membrane effectively transforms surfaces of the Owens Lakebed into stable non-emissive salt beds using a minimum of water resources.

Another scientific finding concerning the Brine Membrane was that the properties of the NaCl-dominated brine are what enable the crusting to float atop the brine. The density of the brine solution is increased because it includes ions of carbonate and sulfate. The high density of the brine, in turn, permits the NaCl crusts to float atop the brine. Floating, this crusts of salt are what reduce evaporation and these crusts will form but not perpetually float on top of pure solutions of NaCl.

To purposefully create a brine membrane for dust control a set of steps must be followed. The first step is to determine whether establishing a brine membrane is practical by measuring the seepage rates of a candidate area. Zero seepage rates are best, however, rates of up to two inches per year could be converted to a brine membrane if periodically recharged by sodium chloride brine. For any wetting basin desired for treatment using the brine membrane concept, the minimum amount of materials is best, and so, inner berms can be constructed within the outer wetting berms of the wetting basins to limit the amount of salt that needs to applied as explained in more detail below. One of ordinary skill in the art would be able to plan and execute the second step of reconfiguring a wetting basin with inner berms. In a third step that follows reconfiguring the wetting basin, as explained below in more detail, salts are mined from within the natural evaporite deposit, dissolved in fresh water that has been heated, diluted to prevent precipitation of the salt species during transit and then moved and flowed into the targeted wetting basin. Once in the wetting basin, evaporation will concentrate the solution and the less soluble salts will precipitate out of solution to form stable horizontal beds that are layered and level. The sodium chloride dominated brine that remains aqueous bathes the salt mass and creates the brine membrane condition that remains aqueous and non-emissive while covering and protecting the lakebed soil beneath from wind erosion. The final step is to monitor the brine membrane treated wetting basin to assure that the bathing supernatant layer of sodium chloride brine remains in place protecting the salt bed from drying and wind erosion.

Interim Solution

In conditions where the lakebed surface has been identified as emissive but where wetting basins have not yet been created, a second embodiment of the invention called the Interim Solution can be implemented; this embodiment of the method utilizes a mixed solution comprising polyacrylamide (PAM) and calcium chloride or other divalent cation chloride salt. When applied onto the lakebed surface, the cation, for example calcium, creates precipitates with the sulfate and carbonate ions that will remain stable in a high pH lakebed environment (as gypsum and lime). Small quantities of PAM serve to tack these precipitates together electrochemically creating a surface skin that is resistant to wind erosion and weather-induced deterioration that is effective for one or more dust seasons. "Dust season" been defined for the Owens Lake example, as the period between October 1 and June 30 of each year. Although the Interim Solution is anticipated to be temporary, it is comparatively inexpensive, and can be reapplied as necessary. The Interim Solution transforms a surface that gives rise to fugitive dust to a stable non-emissive surface using minimal water resources.

Springtime Conservation

There are conditions that may obviate the conversion of an existing wetting basin by the Brine Membrane method—for example where the wetting basin may serve an alternative function as a wildlife habitat or where the potential rate of percolation brine loss from the basin would be unacceptably high and the use of fresh water must be continued. Under these conditions, Springtime Conservation provides a third water conserving embodiment of the method of the present invention. Springtime Conservation can potentially conserve water by safely curtailing supplies of water to wetting basins during the last two months of the dust season in May and June coinciding with intensive evaporation.

Current regulations that set forth the dust season at Owens Lake are based upon observations of the annual period that dust is typically released, and requires that water be supplied to the wetting basins through this period, each year until the end of June. Rainfall during the warmer seasons is known to create competent "summer crusts" that remain until the surface either becomes physically damaged by wind or other mechanical disturbance or undergoes wetting during the winter followed by salt phase-induced destruction of soil cohesion as described above. The June threshold arose because summertime winds are generally insufficient to cause dust emission from those portions of the Owens Lake bed that emitted dust during the winter and spring. The key to re-stabilizing emissive portions of the lakebed each summer is to create a summer crust following rainfall during warm weather. Such rewetting and crust formation typically occur each year because at least some rainfall occurs during the warmer months.

The creation of a summer crust protects lakebed surfaces from dust emissions until a wetting basin is again flooded for dust control in late summer in preparation for the new dust season. The point-in-time when water supplies to wetting basins can be safely curtailed each spring is defined by soil temperatures that govern the phase changes of sodium sulfate and sodium carbonate salts. If soil temperatures are sufficiently warm, above about 50 degrees Fahrenheit for sodium carbonate and above about 65 degrees Fahrenheit for sodium sulfate, and if sufficient salts are present, as indicated by brackish water within each wetting basin, the formation of a summer crust will occur. Summer crusts are stable because the salts precipitate with few inclusive water molecules in the crystalline matrix thereby forming a bridge for grain-to-grain contact within the soil. When dry, summer crust is extremely hard and durable.

Springtime Conservation is a method embodiment that curtails water delivery to the wetting basin when temperatures are safely forecasted to induce summer crust formation. This method, favored for wetting basins that are undesirable for conversion to Brine Membrane can still save almost one third of the water that is used within such wetting basins. Springtime Conservation transforms the dust control wetting basins in the last two months of the dust season from a highly evaporative wetted surface that requires constant resupply with water into a dry non-emissive surface, thereby conserving significant water resources.

DETAILED DESCRIPTION

As will be appreciated by those skilled in the art, aspects of the present invention are described in detail with reference to several embodiments of methods that transform dust-emissive portions of saline soils dominated by sodium salts, such as a dry lakebed, including, but not limited to, the Owens Lake bed surface, to provide complete dust control while minimizing water use.

Method for Selection of Optional Dust Control Methods

Figure 3:
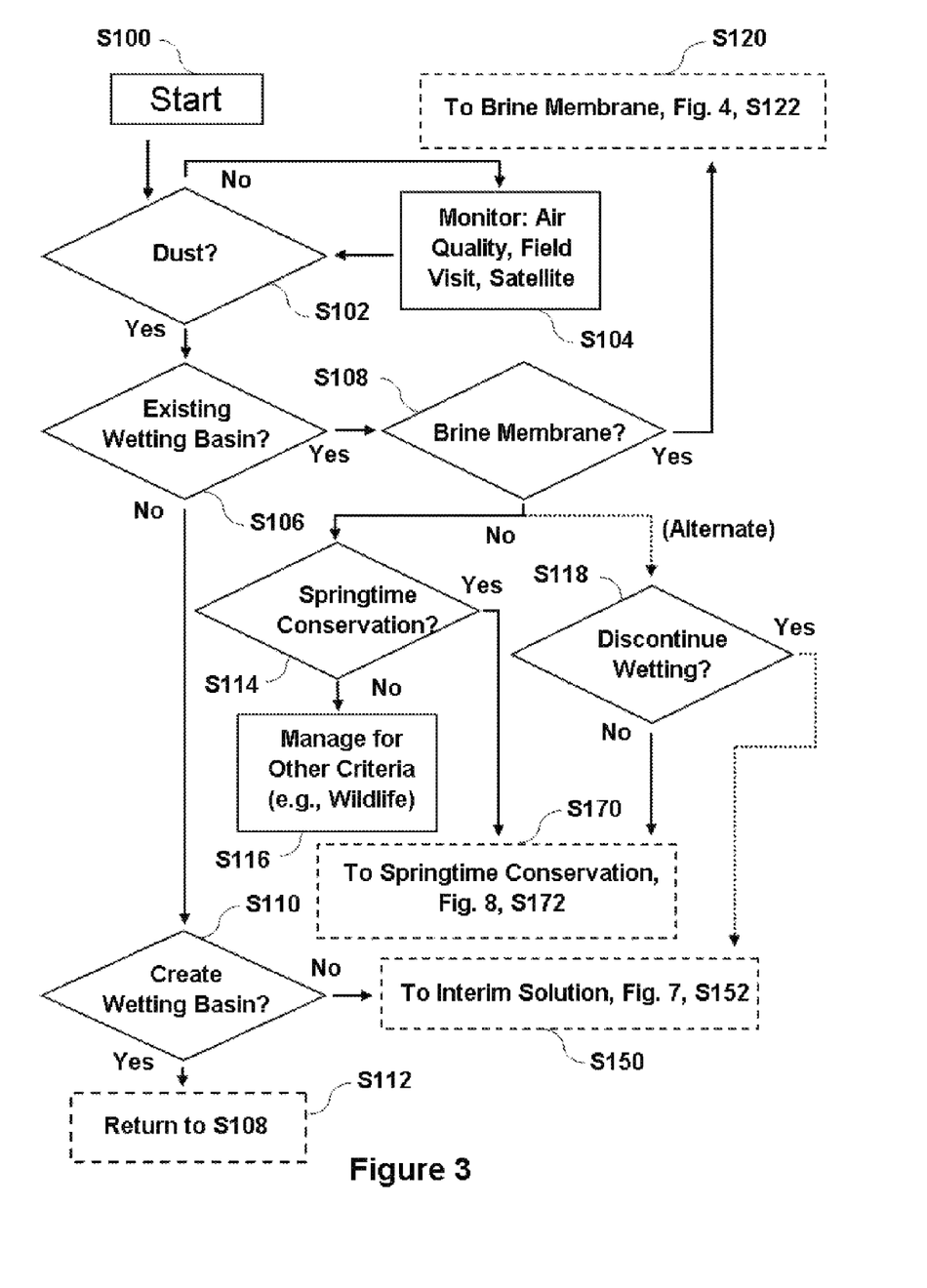
FIG. 3 is a flowchart depicting an overview of the system to place the embodiments in context with respect to the three methods for dust control using minimal water resources.

As shown in FIG. 3, a method of dust control in accordance with one embodiment can begin at START (S100). At step S102 it is determined whether or not there are dust emissions from a discrete region or site, such as a dry lakebed, by monitoring air quality at step S104. As used herein, the term "dust" includes any particulate matter that is expelled or can arise from the earth surface into the atmosphere by natural winds or by wind artificially and inadvertently caused by vehicle passage on the earth surface where it can be inhaled by humans or other animals.

In the event that there is no prevailing dust problem, then the method of the preferred embodiment returns to air quality monitoring step S104 awaiting potential dust conditions. Those of skill in the art will appreciate that implementation of the embodiment methods described herein will likely result in mitigation of identified dust emissions, but that all surfaces of concern, whether subject to control, or not, should be continuously monitored for any deterioration resulting in dust pollution. Step 104 is the responsibility of the agency that monitors and enforces air quality of a lakebed and surrounding region.

Step S106 of the method embodiment queries whether there is an existing dust control wetting basin at the site for dust control. If the response is affirmative, then the method proceeds to S108 that queries whether the wetting basin could be converted to Brine Membrane. The decision at S108 is made in consideration of whether (1) seepage losses are too high, for example in excess of two inches per year; seepage loss is preferably near zero inches per year, and therefore potentially problematic for retention of the bathing sodium chloride brine for the Brine Membrane method that would protect the salt bed mass from desiccation, (2) it is desirable to convert the wetting basin to Brine Membrane control, but such control must be postponed due to priorities and resources outside the scope of this art, or (3) there are competing uses for the wetting basin such as a wildlife habitat that would render the Brine Membrane method less desirable. If the response to query S108, whether to convert an existing wetting basin to Brine Membrane is affirmative, then the method of the embodiment proceeds to step S120 which refers to FIG. 4, a continued description of the embodiment, described in detail below.

If the response to query S108 is negative for any one reason, then the method of the embodiment proceeds to S114 that queries whether the existing wetting basin can be treated to curtail and conserve late-season water delivery using the Springtime Conservation method. An answer in the affirmative passes the process to step S170 of FIG. 8 that describes Springtime Conservation. A negative reply to S114 indicates that the wetting basin is being managed by some other criteria—wildlife habitat, for example.

Returning to S108, and a no answer for whether the existing wetting basin should be converted to Brine Membrane, an alternate pathway leads to the query at S118 for determining whether wetting may be discontinued for water conservation. An answer in the affirmative leads to S150 that invokes using the Interim Solution. A no answer to query S118 leads to Springtime Conservation. Hence, not converting an existing wetting basin to Brine Membrane leads to management to retain wetness (S116), use of Interim Solution to stabilize the surface or to Springtime Conservation (S170).

Returning to decision block S106, if there is no existing wetting basin, then the method of the embodiment proceeds to step S110 that queries whether a wetting basin should be created. If the response to S114 is negative, then the method proceeds to step S150, referencing FIG. 7 and a continued description of the Interim Solution method, described in detail below.

Brine Membrane Method

Figure 4:
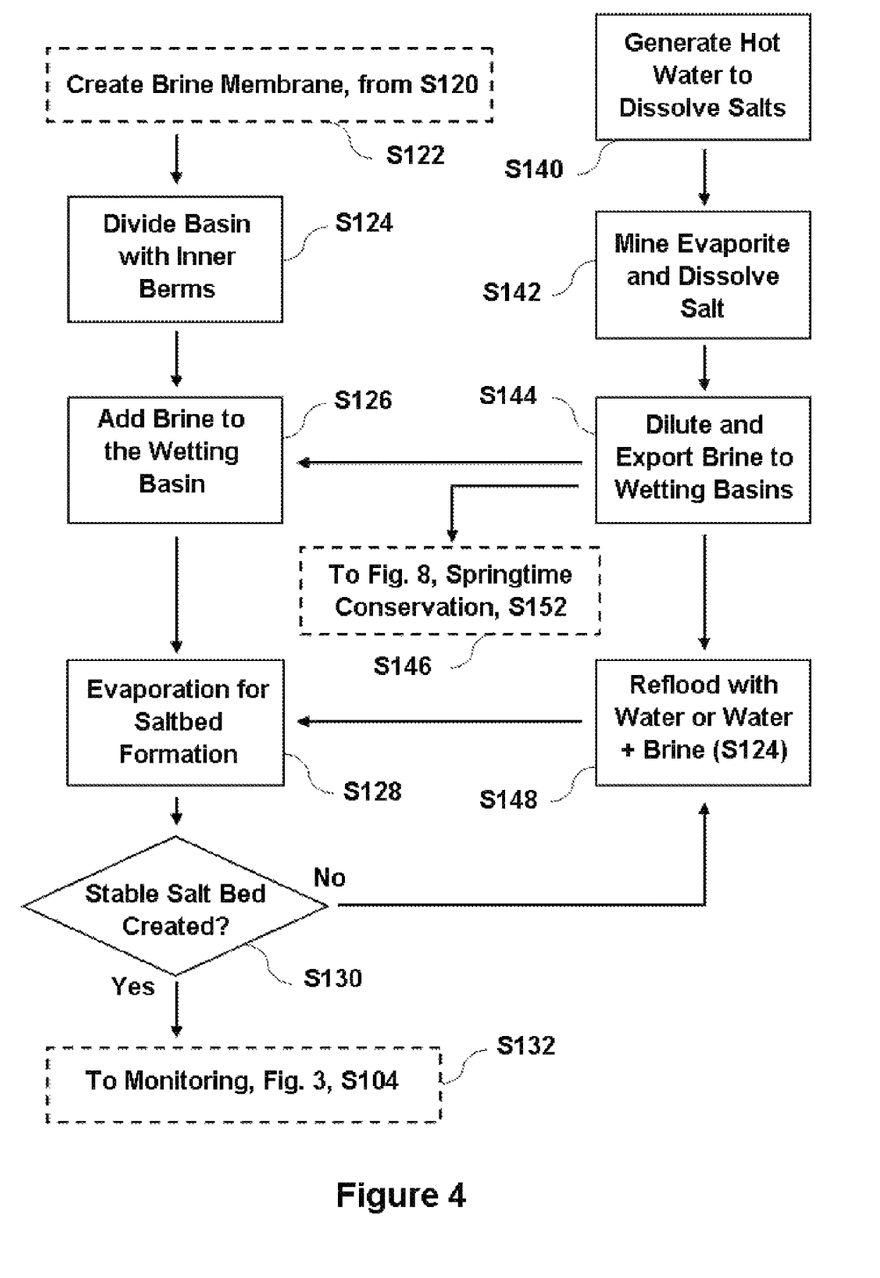
FIG. 4 is a flowchart of an embodiment depicting a method in accordance with one aspect of the present invention, a Brine Membrane that is a stable, non-dust-emissive salt bed with annual evaporation rates less than annual rainfall.
Figure 5:
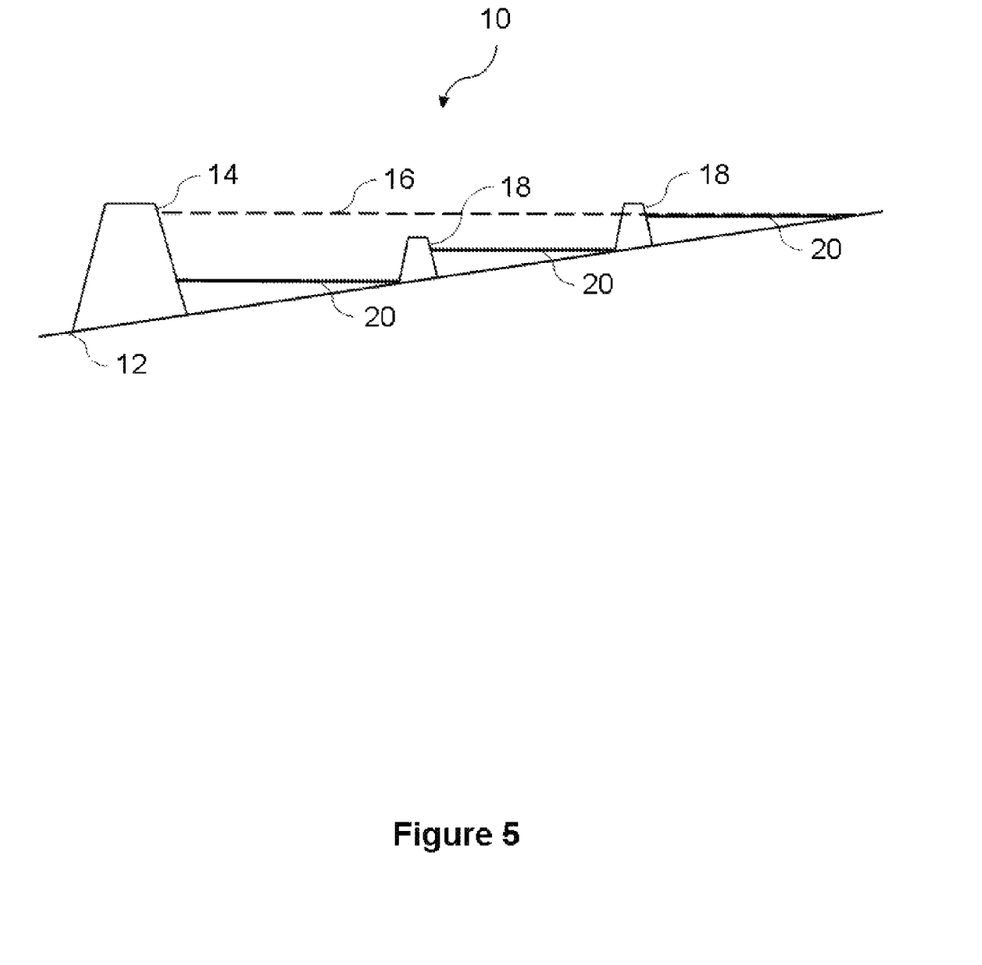
FIG. 5 is a schematic cross-sectional view of a lakebed illustrating the water savings attributable to aspects of the present invention.

FIG. 4 implements the decision made at step S108 to convert an existing wetting basin to Brine Membrane. The first step at S124 reconfigures the existing wetting basin so that the basin requires a much lower volume of salt to create a stable bed than the volume of fresh water previously used to control dust. This reconfiguration is shown on FIG. 5 where an existing wetting basin, indicated at 10, covering an area of lakebed 12, consists of an existing main berm or a main berm 14 that encloses a depth of water when the wetting basin is filled to capacity 16 to protect the lakebed from dust emissions. To reduce the volume necessary to file the wetting basin, interior berms 18 are built that lower the depth required to cover the lakebed, producing much shallower depth than the original wetting basin 20. Reconfiguring the wetting basins, thereby conserves salt and saves money, energy, time, and water in mining, transporting and establishing the Brine Membrane.

Figure 6:
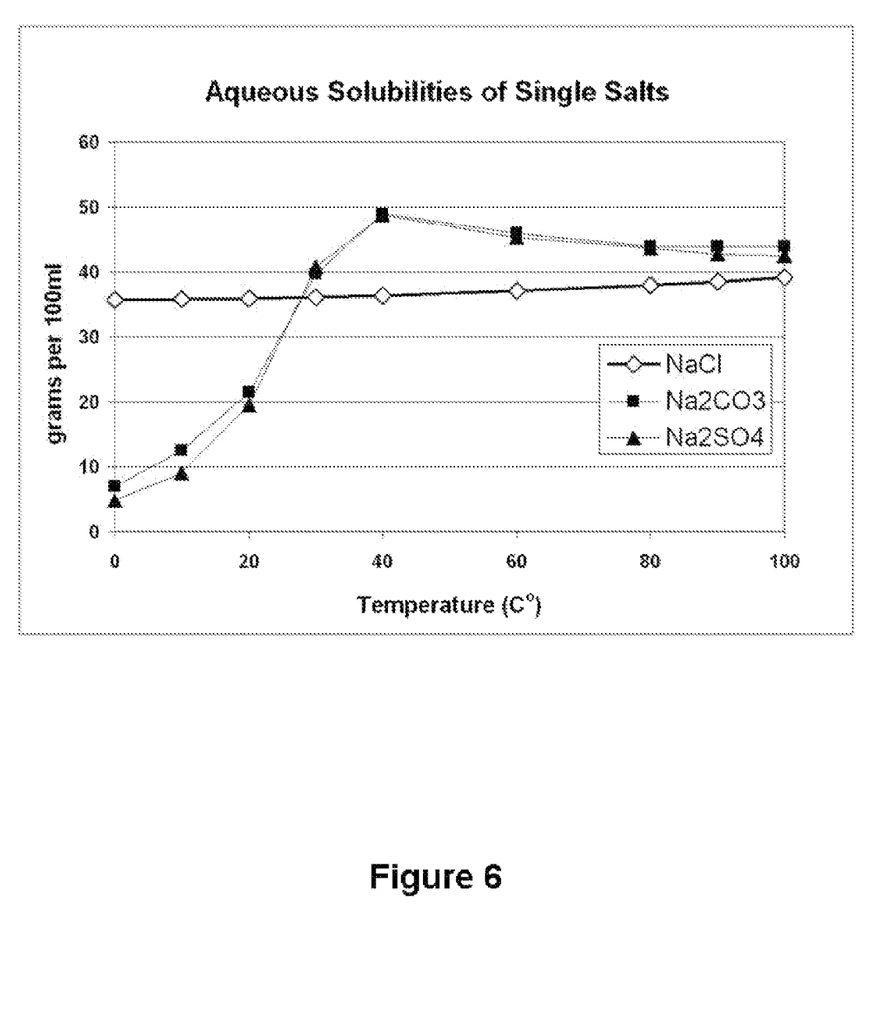
FIG. 6 is a graph showing temperature-dependent single salt solubility for the dominant salts in the Owens Lake as a guideline for managing water temperature required to dissolve the major salt species mined from the source deposit for establishing the Brine Membrane within the dust-control wetting basins.

Step S140 of the method embodiment creates hot water to dissolve the salts mined from the evaporite deposit as indicated in step S142. Hot water can be generated through passive solar or other means and is a necessary step that will permit rapid dissolution of the salts, especially sodium carbonate and sodium sulfate whose solubilities are highly temperature-dependent. In FIG. 6, single salt solubility for the major salt species indicates that the effective temperature to bring sodium sulfate and sodium carbonate into solution should optimally be above 25 degrees Celsius (77 degrees Fahrenheit), necessitating heating. As indicated in FIG. 6, those skilled in the art will appreciate that enclosing, piping or otherwise transporting brine solutions near saturation run the risk of massive precipitation if the temperature drops below the solubility point for these salts. Once plugged by precipitated salts, such piping is generally a total loss. Hence, at FIG. 4, block S144 is a step that calls out dilution of the brine so that it can be safely transported. The imported brine solution from block S144 can be applied in step S126 to the wetting basin by means such as flooding, or other suitable means for dispersing liquid solutions upon a surface.

In another alternative to the method of the embodiment, sodium chloride mining and transport is managed so as to protect salt masses from desiccation and becoming sources of fugitive dust, either within the source deposit or where created within the wetting basin. The method of management includes control of predetermined target ratios of the sodium chloride salt to other salt ion species, including sodium carbonate, sodium bicarbonate and sodium sulfate, in a ratio that lessens the potential for depletion of sodium chloride within the source deposit.

In another variation of the method of the Brine Membrane embodiment at S126, the brine solution can be applied at the lowermost portion of the wetting basin in order to: (1) add the brine in a manner that will minimize the ratio of the surface area to the depth so as to slow overall evaporation during filling, (2) reduce the potential for rill erosion of the lakebed substrate, and (3) help achieve better mixing of the salts such that the Brine Membrane method provides continuous, stable salt beds.

Following application of the brine solution to the wetting basin in step S126, step S128 of the method allows evaporation, and consequent concentration and precipitation of the salts from the brine solution into stable level layers of sodium carbonate, sodium bicarbonate, and sodium sulfate capped by a protective layer of brine that is dominated by sodium chloride, thereby creating the Brine Membrane. In this operation, sodium chloride will remain in solution because it is more soluble over the range of ambient temperatures within the lakebed than the other common sodium-dominated salts as indicated in FIG. 6.

In step S130 of the method of the embodiment, a query is made as to whether the flooding of the wetting basin has produced the desired stable condition of the Brine Membrane, listed as "stable salt bed". If the response is affirmative, then the method of the embodiment proceeds via S132 to step S104—continuous future monitoring. If the response is negative, then the method proceeds to step S148 in which the wetting basin is reflooded with water at a predetermined time that provides the correct temperatures for precipitation of sodium salts of carbonate, bicarbonate and sulfate, for example, the autumn season when seasonal cooling will create this condition. Additional salts may need to be added by implementing step S148 to achieve the correct depth and/or mix of salts in the wetting basin. Missing the desired stable endpoint by the Brine Membrane method in level layers of precipitate instead, can create an undesirable condition of spatial fractionation of salt species where potentially dust-emissive salts are exposed to the atmosphere. This can occur if the evaporation of the water from the brine is high while the wetting basin is filling and if the brine has been run across shallows with very high evaporation rates. This factor can also be remedied at the time of brine entry by monitoring and increasing the proportion of water within the brine. Also, filling the wetting basin at the downstream end will tend to prevent this condition from occurring.

It is assumed that for Brine Membrane conversion, potential seepage losses and static water table levels will have been measured and unsuitable portions of the lakebed with unacceptably high seepage rates and/or deep water tables will have been avoided. However, in the event that the seepage losses from the wetting basin cause the reduction of a significant portion of sodium chloride-dominated brine that percolates from the wetting basin, sodium chloride brine can be recharged directly from solutions that develop atop the source deposit each winter due to direct precipitation and/or runoff onto the source deposit from regional drainage—subject to understanding and managing the overall sodium chloride resource in evaporite deposit. The same site infrastructure used for the steps in FIG. 4 can be used to resupply the sodium chloride, mixed with other dominant salts, if desired, to maintain the brine membrane, thereby protecting the surface from dust emissions while committing only a minute fraction of the fresh water formerly used for dust control. Monitoring and understanding the system-wide balance of sodium chloride is necessary in order to harvest and export the sodium chloride while protecting the source deposit from desiccation.

Interim Solution Method

Figure 7:
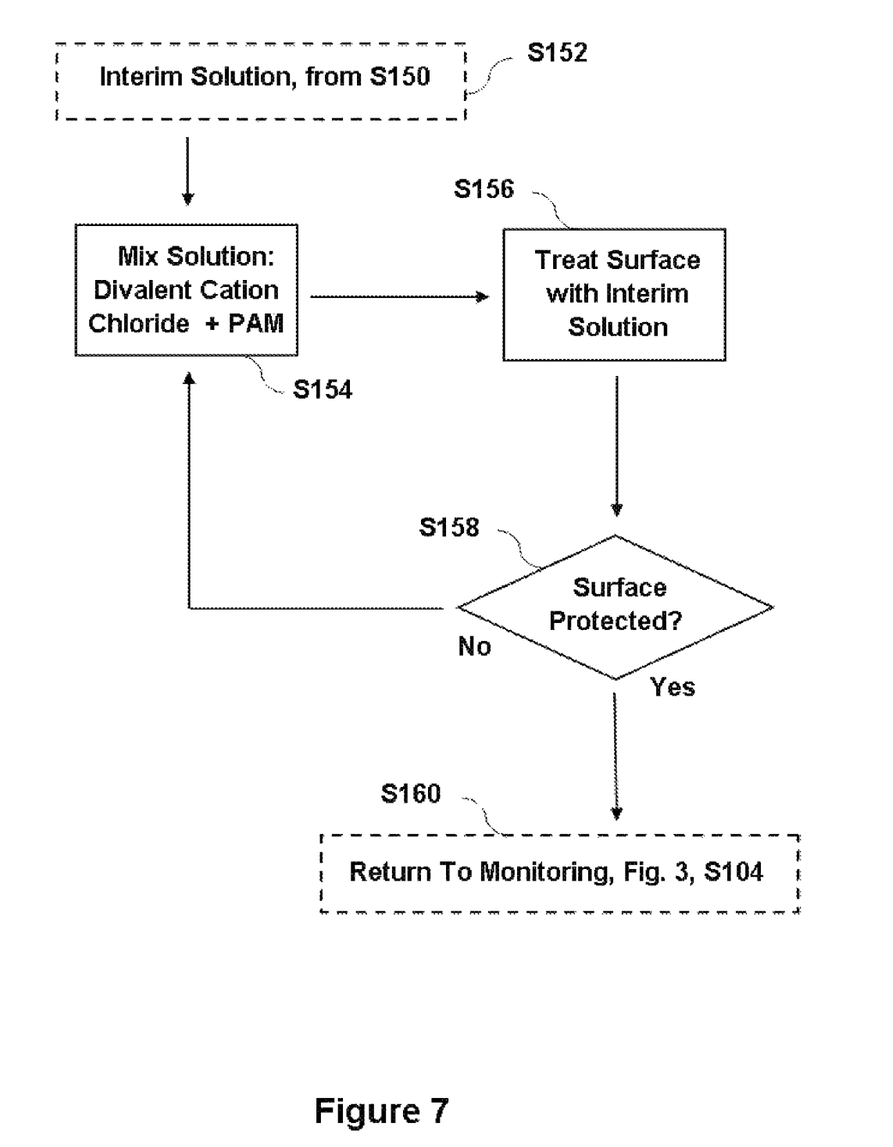
FIG. 7 is a flowchart of an embodiment depicting a method in accordance with another aspect of the present invention, the Interim Solution, that is, a temporary application to stabilize dust-emissive surfaces using salt and polymer chemistry.

Referring back to step S110 where an area of the lakebed was identified as dust-emissive, did not yet have a wetting basin, nor was planned to receive a wetting basin, the means for protecting the surface called for the Interim Solution embodiment in FIG. 7, that starts at S152 and comprises application of an aqueous compound to provide temporary control of dust. In the Interim Solution method, a dilute aqueous solution, containing one or more divalent cation chloride salts, for example, readily-available salts of calcium chloride or magnesium chloride, and a dissolved portion of an anionic polyacrylamide (PAM), are mixed together to form a "mix solution." Other suitable salts and polymers can be used in conjunction with or as substitutes for the divalent cation salts and PAM polymer noted herein.

The mix solution can be applied directly onto the dry dust-emissive surface to be treated in step S156, such as a lakebed that contains sodium carbonate and sodium sulfate. The mix solution will dissolve the salts in the lakebed and the divalent cations will form stable precipitates of carbonate (limestone) and sulfate (gypsum). Sodium chloride is a byproduct of this reaction that remains in solution within the soil matrix where it will tend to migrate to the surface of the wetted lakebed with capillarity and evaporation to form thin sodium chloride crusts that function to reduce evaporation. PAM functions to electrochemically tack the precipitates and clays of the surface together, increasing surface stability to resist the effects of wind and weather.

After application of the mix solution, the product of the Interim Solution method is tested to determine whether it has protected the surface from wind erosion in step S158. If so, the embodiment of the method proceeds to step S146, that returns to step S104 calling for continual monitoring of all lakebed surfaces to ensure that correct treatment has occurred and that dust is not released. If, however, the answer to query S158 is no, the surface is not properly protected, reapplication may be made. With each reapplication, the surface crusting will become more resistant to wind erosion and remain intact for longer periods.

Formulation of the mix solution may vary depending upon the dry surface to be treated and may require a pretreatment with dilute sodium carbonate and sodium sulfate salts. For example, certain substrates that make up the Owens Lake bed are dominated by coarse sands, particularly in the region where the Owens River and other tributary inflows debouch onto the lakebed. Because these sands may have been leached by precipitation over many decades, they commonly contain low concentrations of the dominant salts of Owens Lake, sodium carbonate and sodium sulfate and so, the mix solution, formulated to bond with dominant salts to stabilize the soil, may not be available in optimal supply for this stabilizing reaction. These dry sandy soils often blow and emit dust and in this case, such sands can become more stable if first provided with a pretreatment of Owens Lake native brine that is rich in sodium carbonate and sodium sulfate to then bond with the mix solution to provide the grain-to-grain bridging for holding the surface sand in place against wind and weather. The majority of the Owens Lake bed is fine textured and enriched with sodium carbonate and sodium sulfate and so should not need such added pretreatment.

Though not required for the mix solution to work, field tests have shown enhancement for the stabilizing effects of this method when the surface is compacted prior to application. A person skilled in the art will recognize the dynamic nature of a dust-emissive lakebed and the necessity to tailor the application rate and concentration of the mix solution to the substrate to best stabilize the surface.

Springtime Conservation Method

Directing attention back to the flowchart in FIG. 3, in decision block S108 after determining in step S106 that there is an existing wetting basin that may be converted to a salt bed in step S108, but a brine membrane solution is not acceptable, the method passes to step S114 invoking the Springtime Conservation. If no, then the management of the wetting basin is following some criterion other than water conservation, for example maintaining a wet condition for waterfowl. If the answer to the query is yes, then the existing wetting basin can be subjected to analysis for Springtime Conservation, a method embodiment as described in FIG. 8, starting at step S172.

Figure 8:
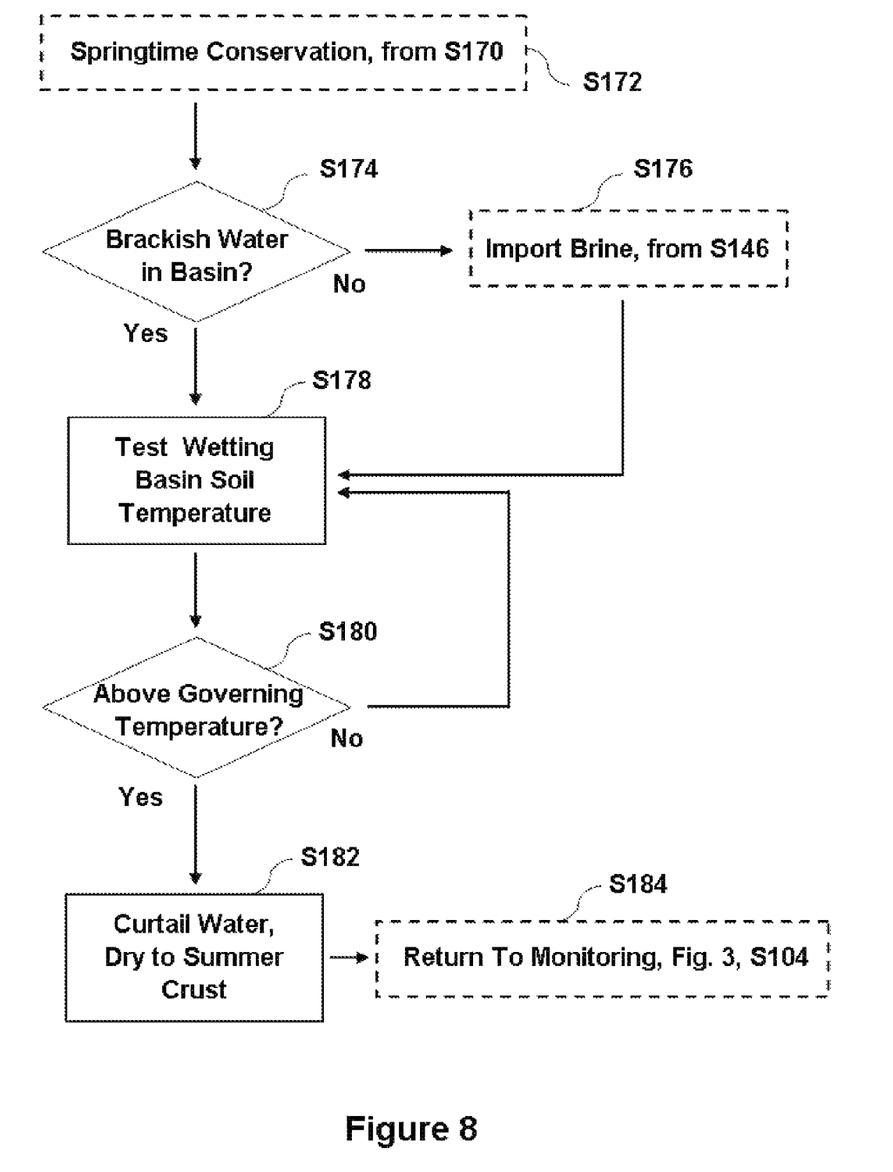
FIG. 8 is a flowchart of an embodiment depicting a method in accordance with still another aspect of the present invention, Springtime Conservation, that uses measurements of soil temperature to decide when to curtail water supply to wetting basins in the spring.

Step S174 determines, by testing, whether the wetting basin has sufficient salts present in the lakebed substrate to cause the water released for dust control to become brackish—very salty, though not to the extent of brine. Residual salts in the soil and the flooding water are necessary for attainment of the desired end condition for Springtime Conservation, a summer crust that is stabilized by salt crystals that provide grain-to-grain bridging that arms the soil against the action of wind.

In the event that the answer is no, the salts can be recharged to the wetting basin in block S178; the salt recharging adds the salts that are mined, dissolved and imported at Step 176 from brine mining and generation in steps S140, S142 and S144 on FIG. 3. In the event that the test result in step S174 is yes, then the process passes to step S178 comprising a test for the soil temperature within the wetting basin. If the soil temperature is either at, or forecasted to be at, the governing temperature for the phase change of the dominant salts in step S180, the Springtime Conservation method is invoked at step S182 and water delivery to the wetting basin is curtailed. This curtailment then conserves the water that would be supplied until June 30, thus saving about 32% of the water used for dust control through the entire October 15 to June 30 dust season.

In the event that curtailment is invoked, the final step in the Springtime Conservation method embodiment passes back in block S184 to step S104 of FIG. 3 that provides for monitoring of the system.

Example Embodiment

Other features and embodiments of the present invention are described herein with reference to the particular site of Owens Lake, Calif. The system and methods of the embodiments are adapted for use in dust control wetting basins on the Owens Lake bed. The area of these basins was 35.8 square miles measured on Apr. 22, 2011 by Landsat satellite data used for monitoring wetting basin compliance.

The main goal of the Owens Lake embodiment is to control dust while providing nearly complete water conservation. Other goals are to implement dust control for the lowest possible cost, as rapidly as possible, and using a minimum of resources. For example, a method that competes with the three conservation methods and that is under serious consideration, is the placement of four to eight inches of gravel atop engineering fabric—a method that may cost up to fifty million dollars per square mile, require burning millions of gallons of diesel fuel. Once gravel is in place it is permanent, allowing no other options.

By rough estimate the total dust control area under shallow flooding, plus areas that have been identified for conversion to active dust control, and areas that are a likely future targets for dust control, is about 46 square miles. As will be discussed below, of this area, 10 to 20 square miles might be managed as wildlife habitat that will require a water supply irrespective of conservation. That leaves between 26 and 36 square miles to be managed for dust control and water conservation using the Brine Membrane and Interim Solution methods.

The Brine Membrane is the most expensive of the three methods and must be limited in its application to those areas with low potential for percolation loss of the sodium chloride dominated brine resource. A cursory evaluation of the Owens Lakebed indicates that there are about 16 square miles of dust control wetting basins, existing and planned, that have both very shallow water tables and very slow percolation rates. The likely required time for full conversion to 16 square miles of Brine Membrane is around five years, a rate dependent upon the rate of mining and dissolution of brine. This time period allows for careful measurement and management of salts on the lakebed.

There is great interest for management and enhancement of wildlife habitat that has become established on the Owens Lakebed as a result of the many square miles of shallow flooding. The areas that have been discussed range between 10 and 20 square miles. Limited opportunity exists to conserve water within wildlife habitat through application of Springtime Conservation, though the potential extent of that application is not yet known. Especially for habitat that is seasonal and used by migratory waterfowl, Springtime Conservation may have applicability for the period after the waterfowl have departed, still well before the recognized end of the dust season (June 30, each year).

On a residual area of 10 to 20 square miles that cannot be treated by Brine Membrane or serve as wildlife habitat, dust can be controlled using the Interim Solution. Operational application of the Interim solution can take place by gradually taking wetting basins out of service allowing them to dry and treating them with this spray on coating. The efficacy of the Interim Solution is determined by the residual sulfate and carbonate salts of sodium that remain in the lakebed. These minerals attach to the calcium from the calcium chloride in the mix solution with PAM to form insoluble limestone and gypsum. Thus, in the event that fresh water has leached areas of these native salts required for Interim Solution to work, these salts can be replaced by spraying, or by adding salts to the wetting basin inflow prior to conversion to management with Interim Solution. The key to a well run management program employing Interim Solution will be an active effort to test conditions before treatment.

Within the Interim Solution PAM is weakly bonded electrochemically with the calcium in the mix solution, and when exposed to the salts in the lakebed, creation of insoluble precipitates in the matrix of PAM molecules provides an instant crust. Testing numerous formulations have shown that highly dilute mix solutions (30× dilution of saturated calcium chloride) may actually work better than more concentrated formulas. Formulas may need to be varied according to the texture and salt concentrations of the substrate that is treated.

Calcium chloride for the Interim Solution is mined approximately 200 miles south of the Owens Lake and is available in sufficient quantities for treatment of 10-20 square miles. Spray equipment developed for agriculture can be adapted to apply the Interim Solution. The large areas for treatment do not need to converted to Interim Solution control all at once and can best be gradually phased in over several years. The first areas to treat would be those identified to require some form of dust control but with none currently in place. After dust is controlled by the Interim Solution on such identified uncontrolled areas first, then this method can be applied to dust control wetting cells that are gradually decommissioned.

Large areas of dust control can be accomplished using the Interim Solution method if it is employed in a "fire-brigade mode" where the treatment is rapidly applied after the location is identified as emissive. Over time, some locations may receive repeated treatment. Retreatment is anticipated to create highly stable surfaces. Pre-treatment may be warranted for areas anticipated to be problematic before the dust season. Interim Solution can be applied any time of the year, especially as a summer activity to ensure that all potential dust-producing areas that have been identified during the previous dust seasons are treated and resistant.

Areas treated with Interim Solution must be made off-limits for any vehicular traffic that would compromise the stabilizing crust. Likewise, once treated, the application equipment should be moved in such a manner as to stay off of the treated areas. Thus, a treatment with Interim Solution will terminate by withdrawal of the spray equipment that treats access ways as the last step so that no portions of the lakebed are left with broken crusts that are potentially emissive.

The regulatory agency for Owens Lake air quality maintains, and is improving, a system of permanent, high resolution video cameras of the lakebed that are used for identification of dust producing areas. These cameras are operated daily and after dust has been detected, analysis provides geo-correct maps of the dust sources that can be used to deploy Interim Solution treatments with days of the event. Global position system records of treated areas and identified areas will provide confirmation of treatment as well as long-term electronic records for enhancing management.

A transition period of about five years is estimated to be required to achieve the 46 square miles of water-conserving dust control, if this objective is prosecuted intently. During transition to full implementation the wetting basins must remain flooded with fresh water prior to conversion to Brine Membrane and Interim Solution.

The potential for using Springtime Conservation is especially great during the initial phase of the conservation program when the largest areas for dust control are using fresh water. After completion of conversion to Brine Membrane and Interim Solution, the Springtime Conservation method may still be of use, but only for that portion of wildlife habitat where seasonal use has ended—for example, where migratory wildfowl have migrated on leaving the managed wetting basin behind. Even though its useful life may be limited, Springtime Conservation can be placed into service rapidly and save significant water during the transition period.

The water that can be conserved with these methods is immense. For the high conservation assumption, with 10 square miles remaining flooded as wildlife habitat, the potential savings for treating the residual 36 square miles with Brine Membrane or Interim Solution will eventually save over 92,000 acre feet of water per year (calculated using 4 feet of seasonal water application over 36 square miles). For the low estimate, assuming 20 square miles as wildlife habitat, would yield conservation on 26 square miles of the lakebed, or over 66,000 acre feet per year. Additional savings through application of the Springtime Conservation method could potentially deliver additional water conservation after conversion, and play a significant role in water conservation during the transition to full application of Brine Membrane and Interim Solution.

Of the three methods, the Brine Membrane is the most complex since it will require management of the evaporite source deposit as well as the wetting basin target deposits. The source of the salts used to create the Brine Membrane within wetting basins in the first embodiment comes from the source evaporite deposit whose mineral content is shown below in Table 1. These data resulted from over one thousand sampling boreholes made into the source deposit by three mining companies operating on Owens Lake over the past half century. The average brine phase content in the evaporite deposit is 30% by weight and the solid phase is 70% by weight. Abbreviations are Na, sodium; $CO_3$, carbonate; $HCO_3$, bicarbonate: Cl, chloride; $SO_4$, sulfate.

TABLE 1

| | Average % Weight of Hydrated Total | Average % Weight of Soluble Salts |
|---|---|---|
| SOLID PHASE | | |
| $Na_2CO_3$ | 41.5% | 50.9% |
| $NaHCO_3$ | 25.0% | 30.7% |
| NaCl | 2.6% | 3.2% |
| $Na_2SO_4$ | 12.4% | 15.2% |
| Insoluble | 9.1% | 100% |
| $H_2O$ | 9.4% | |
| | 100% | |
| BRINE PHASE | | |
| $Na_2CO_3$ | 8.9% | 28.2% |
| $NaHCO_3$ | 0.2% | 0.6% |
| NaCl | 18.0% | 57.0% |
| $Na_2SO_4$ | 4.5% | 14.2% |
| $H_2O$ | 68.4% | 100.0% |
| | 100.0% | |

A sufficient quantity of salt exists within the source evaporite deposit to supply all, or part of the existing approximately 36 square-mile surface of the wetting basins with salt deposits, while also maintaining in situ, sufficient salt in the existing evaporite deposit to protect that surface from dust emissions. Following the methodology of the Brine Membrane embodiment ensures that salts from the source evaporite deposit would replace fresh water within the wetting basins in such a manner that the conditions created by the Brine Membrane in the Owens Lake wetting basins would maintain a stable non-emissive surface in the same manner as the evaporite deposit.

The massive amount of salt required to be mined and moved to the wetting basins for replacement of fresh water and the tendency for the limited quantity of the sodium chloride ions to remain in solution requires that exporting of the salts for creation of the Brine Membrane follow substantially the same proportions of salts as in Table 1. This ensures that the sodium chloride is not depleted from the evaporite source deposit. The protective crusting that controls evaporation is conferred by sodium chloride and this is important for both creating the Brine Membrane within wetting basins and for retaining such conditions within the mined and unmined portions of the evaporite deposit.

The Owens Lake climate, with three to four inches of rain and snowfall each year is intensely arid and evaporation rates for fresh water exceed six feet per year. Even so, the thin crusting that develops atop sodium chloride dominated brine can reduce the annual evaporation rates to below the level of the annual total rain and snowfall received. The special properties of the sodium chloride dominated brine in Owens Lake enables support of a thin crust to remain floating atop the saturated brine beneath. The natural dissolution of small amounts of sodium carbonate and sodium sulfate in this sodium chloride dominated brine causes an increase in the density of this liquid so that the crust remains floating. It can be demonstrated that such crusts can form only temporarily in surface tension but then sink through the liquid of saturated solutions of pure sodium chloride.

The property of the sodium chloride-dominated brine that reduces evaporation atop the Brine Membrane is what confers its effectiveness as a dust control measure—it allows rain and snow to enter and will remain wet, no matter how hot and dry the conditions. The agency responsible for measuring and enforcing air quality at Owens Lake recognizes that, for purposes of dust control, the brine membrane is the equivalent of shallow flooding specifically because it retains the salt mass below in a hydrated state.

The principal salts of the Owens Lake are formed by cation sodium in combination with the anions of carbonate, sulfate and chloride. Sodium sulfate and sodium carbonate change the hydration state due to temperature and water availability. To move the massive quantities of salts required in the Brine Membrane method across many square miles of wetting basins, the source deposit may be mined mechanically. Because of temperature-dependent solubility of both sodium carbonate and sodium sulfate, the principal salt components within the source deposit, dissolving these salts will require heated water.

Passive solar collection is a convenient, potentially inexpensive and practical method to generate sufficient hot water at the Owens Lake site; however, other methods could be used to generate the hot water by burning fuel, especially during a cloudy day. Potential also exists for generating a certain amount of heated brine by flooding and draining wetting basins, however, the insoluble fraction (Table 1) will tend to seal off the salt mass over time and this sealing must be overcome, perhaps through mechanical means such as scarification. Systems of diked off and mined panels can be used to store brine of variable salt content that can be blended to create the desired mix to be exported from the evaporite deposit. A number of mechanically mined panels are currently located at the south end of the evaporite deposit. These panels are highly stable against wind erosion and can serve as the model to protect the evaporite deposit once it has been mined.

The terminology used herein is for the purpose of describing particular embodiments only and is not intended to be limiting of the invention. As used herein, the singular terms "a," "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements and specifically claimed. The description of the present invention has been presented for purposes of illustration and description, but is not intended to be exhaustive or limited to the embodiments disclosed. Many modifications and variations will be apparent to those of ordinary skill in the art without departing from the scope and spirit of the invention. The example embodiments were chosen and described in order to best explain the principles of the invention and its practical applications, and to enable others of ordinary skill in the art to understand the invention with its various modifications as are suited to the particular use contemplated.

What is claimed is:

1. A method of dust control on a saline dry lakebed with at least one wetting basin comprising the steps of:
   measuring lakebed infiltration rates within the at least one wetting basin to determine if the infiltration rate is below two inches per year, thus, suitable for creating and maintaining a brine membrane;
   creating one or more inner berms on the at least one wetting basin to minimize the depth of brine solution necessary for treatment;
   if the infiltration rate is below two inches,
      applying to the at least one wetting basin a first brine solution defined as having average weight percentages for soluble constituents of: between 15% and 65% $Na_2CO_3$, between 1% and 40% $NaHCO_3$, between 2% and 70% NaCl, and between 5% and 70% $Na_2SO_4$ until a brine membrane, defined as horizontal layers of precipitated salts of $Na_2SO_4$, $Na2CO_3$, and $NaHCO_3$ that are level across the majority of the wetting basin and that remain bathed in said first brine solution that protects the salt mass from desiccation, is formed;
   if the infiltration rate is above said two inches,
      apply additions of said first brine solution until a brine membrane is formed; and
   maintaining the brine membrane by addition of brine solution as necessary.

2. A method for controlling dust in a dry lakebed comprising the steps of:
   creating or locating at least one existing wetting basin having an outer berm and adding at least one inner berm;
   measuring lakebed infiltration rates within the at least one wetting basin to confirm that the infiltration rate is below two inches of infiltration per year;
   transporting a brine solution comprising dissolved salts from an existing on-site evaporite deposit on the dry lakebed;
   depositing said brine solution having between 15% and 65% $Na_2CO_3$, between 1% and 40% $NaHCO_3$, between 2% and 70% NaCl, and between 5% and 70% $Na_2SO_4$ into said at least one wetting basin;
   allowing said brine solution within said at least one wetting basin to evaporate;
   monitoring and confirming that the evaporation of water from the transported brine solution has resulted in the creation of a brine membrane that has a supernatant and bathing layer of brine solution overlying horizontal beds of precipitated salts of $Na_2SO_4$, $Na2CO_3$, and $NaHCO_3$; and
   with the brine membrane in place, monitoring over time to assure that infiltration does not exceed the two inch rate of infiltration so as to drain the wetting basin of said brine solution that forms a bathing and supernatant layer that protects the salt bed from drying and wind erosion.

3. The method of claim 2 wherein one of the precipitated salts is $Na_2SO_4$, among others.

4. The method of claim 2 wherein one of the precipitated salts is $Na_2CO_3$, among others.

5. The method of claim 2 wherein one of the precipitated salts is $NaHCO_3$, among others.

6. The method of claim 2 additionally comprising the steps of locating, mining, dissolving and transporting said precipitated salts from a natural evaporite deposit on the lowest topography.

7. The method of claim 6 wherein said locating step comprises a search for an evaporite deposit of precipitated salts and brine solution.

8. The method of claim 7 wherein said transporting step comprises creating a solution by dissolving the precipitated salts in heated water and flowing said solution through a carrier interconnecting said evaporite deposit site and said at least one wetting basin.

9. The method of claim 8 wherein said step of depositing said precipitated salts comprises discharging the solution at the lowermost portion of the wetting basin as a means of avoiding erosion.

10. The method of claim 2 additionally including the step of adjusting the brine solution for infiltration losses identified through monitoring by mining, moving and depositing brine solution from said sources.

11. A method of dust control on a saline dry lakebed that is dominated by exposed beds of carbonate and sulfate salts of sodium due to anthropomorphically-changed desiccating hydrology, the dominant salts prone to create large sources of airborne dust, the lakebed having formed an on-site natural evaporite deposit in the lakebed lowest topography, the evaporite comprising precipitated salts and salt held in aqueous brine solution dominated by sodium chloride that remains in solution because it is more soluble than sodium sulfate and sodium carbonate at ambient temperatures comprising:
  locating or building at least one wetting basin including at least one outer wetting berm;
  creating at least one inner berm within said at least one outer wetting berm;
  measuring lakebed seepage rates within the wetting basin to confirm that the seepage rate is below two inches per year of as required for creating and maintaining a brine membrane;
  mining salt from the natural on-site evaporite deposit;
  dissolving said salt from the evaporite deposit to create a brine solution;
  moving said brine solution within the at least one wetting basin if the seepage rate is below the required rate;
  adjusting said brine solution so as to have average weight percentages for soluble constituents of: between 15% and 65% $Na_2CO_3$, between 1% and 40% $NaHCO_3$, and between 2% and 70% NaCl, and between 5% and 70% $Na_2SO_4$, measured by weight; and
  further adjusting the brine solution in said at least one wetting basin so as to create precipitated horizontal beds of salt over the soluble salts within the underlying brine solution.

12. The method of dust control of claim 11 additionally comprising the steps of:
  dissolving the mined salt in water prior to moving said salt.

13. The method of claim 12 wherein said water is heated prior to dissolving the mined salt.

* * * * *